United States Patent
Roy et al.

(10) Patent No.: US 7,440,407 B2
(45) Date of Patent: Oct. 21, 2008

(54) METHOD AND APPARATUS FOR CENTRALIZED MONITORING AND ANALYSIS OF VIRTUAL PRIVATE NETWORKS

(75) Inventors: Sumantra Roy, Hoffman Estates, IL (US); Patricia B. Quinn, Glenview, IL (US)

(73) Assignee: AT&T Corp., New York, NY (US)

( * ) Notice: Subject to any disclaimer, the term of this patent is extended or adjusted under 35 U.S.C. 154(b) by 562 days.

(21) Appl. No.: 11/052,259

(22) Filed: Feb. 7, 2005

(65) Prior Publication Data

US 2006/0176816 A1 Aug. 10, 2006

(51) Int. Cl.
G01R 31/08 (2006.01)
G06F 11/00 (2006.01)
G08C 15/00 (2006.01)
H04J 1/16 (2006.01)
H04J 3/14 (2006.01)
H04L 1/00 (2006.01)
H04L 12/26 (2006.01)

(52) U.S. Cl. .................................... 370/241
(58) Field of Classification Search ........... 370/241, 370/252, 254, 351, 352, 389, 401, 465
See application file for complete search history.

(56) References Cited

U.S. PATENT DOCUMENTS

| | | | |
|---|---|---|---|
| 6,363,053 B1* | 3/2002 | Schuster et al. | 370/230 |
| 6,785,237 B1* | 8/2004 | Sufleta | 370/236 |
| 6,954,789 B2* | 10/2005 | Dietz et al. | 709/224 |
| 7,035,222 B2* | 4/2006 | Cahn | 370/241 |
| 7,152,115 B2* | 12/2006 | Ould Brahim et al. | 709/238 |
| 7,185,070 B2* | 2/2007 | Paul et al. | 709/220 |
| 7,274,684 B2* | 9/2007 | Young et al. | 370/352 |
| 2002/0114274 A1* | 8/2002 | Sturges et al. | 370/229 |
| 2002/0143929 A1* | 10/2002 | Maltz et al. | 709/224 |
| 2003/0142674 A1* | 7/2003 | Casey | 370/393 |
| 2005/0018605 A1* | 1/2005 | Foote et al. | 370/230 |
| 2005/0041592 A1* | 2/2005 | Hannel et al. | 370/241 |
| 2005/0108379 A1* | 5/2005 | Gray et al. | 709/223 |
| 2005/0190757 A1* | 9/2005 | Sajassi | 370/389 |
| 2005/0238017 A1* | 10/2005 | Delegue et al. | 370/389 |
| 2006/0098654 A1* | 5/2006 | Tingle et al. | 370/389 |
| 2007/0025261 A1* | 2/2007 | Ginsberg et al. | 370/250 |

* cited by examiner

Primary Examiner—Edan Orgad
Assistant Examiner—Hoang-Chuong Q Vu

(57) ABSTRACT

In one embodiment, the present invention is a method and apparatus for monitoring virtual private networks (VPNs) supported on a multiprotocol label switching (MPLS) backbone network. In one embodiment, a method for remote monitoring of a VPN supported on an MPLS backbone network includes capturing traffic to and/or from the virtual private network (e.g.; via a network probe) and analyzing the captured traffic in accordance with one or more service objectives. In another embodiment, the present invention involves remotely simulating network conditions in a virtual private network, for example by sending test patterns to a shared customer edge router connected to the virtual private network, forwarding the test patterns, via the shared customer edge router, to the MPLS backbone network, and forwarding the test patterns over the MPLS backbone network to a discrete customer edge router associated with the virtual private network.

2 Claims, 5 Drawing Sheets

US 7,440,407 B2

METHOD AND APPARATUS FOR CENTRALIZED MONITORING AND ANALYSIS OF VIRTUAL PRIVATE NETWORKS

FIELD OF THE INVENTION

The present invention relates generally to service networks, and relates more particularly to the maintenance of virtual private networks.

BACKGROUND OF THE INVENTION

FIG. 1 is a schematic diagram illustrating an exemplary multiprotocol label switching virtual private network (MPLS VPN) connection 100. A plurality of customer VPNs connect to an MPLS backbone network 102 (e.g., maintained by a service provider) via respective customer edge (CE) routers $104_1$-$104_n$ (hereinafter collectively referred to as "CE routers 104"). Each CE router 104 is coupled to at least one switch $106_1$-$106_n$ (hereinafter collectively referred to as "switches 106") in the backbone network 102. Each CE router/switch connection comprises two elements: (1) a physical connection $108_1$-$108_n$ from the CE router to a switch layer-2 component $110_1$-$110_n$; and (2) a logical connection $112_1$-$112_n$ to a switch layer-3 component $114_1$-$114_n$. Each switch 106 in the backbone network 102 is also physically linked to other switches 106, e.g., via links 116.

Monitoring of customer traffic (e.g., from customer VPNs) in the backbone network 102 is very complicated, and hence is typically avoided. Instead, monitoring and analysis of customer VPNs is accomplished by sending teams of technicians armed with network equipment to a customer location. These technicians gather data on-site, and then transmit the gathered data to a second team of experts for further analysis. While such methods enable service providers to provide effective analysis and troubleshooting results for their clients, they are often very expensive for the service providers due to the costs involved in sending the technicians and equipment to the customer locations. In cases where additional trips to the customer location are required for further data collection, these costs become even more daunting.

Moreover, because the collected data is not immediately analyzed, but must be sent to a second team of experts for analysis, a significant amount of time is expended in the collection and analysis of the data. Analysis and troubleshooting of customer VPNs is therefore slowed.

Thus, there is a need in the art for a method and apparatus for centralized monitoring and analysis of virtual private networks.

SUMMARY OF THE INVENTION

In one embodiment, the present invention is a method and apparatus for monitoring virtual private networks (VPNs) supported on a multiprotocol label switching (MPLS) backbone network. In one embodiment, a method for remote monitoring of a VPN supported on an MPLS backbone network includes capturing traffic to and/or from the virtual private network (e.g., via a network probe) and analyzing the captured traffic in accordance with one or more service objectives. In another embodiment, the present invention involves remotely simulating network conditions in a virtual private network, for example by sending test patterns to a shared customer edge router connected to the virtual private network, forwarding the test patterns, via the shared customer edge router, to the MPLS backbone network, and forwarding the test patterns over the MPLS backbone network to a discrete customer edge router associated with the virtual private network.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

In one embodiment, the present invention relates to the monitoring and analysis of virtual private networks (VPNs) supported on multiprotocol label switching (MPLS) backbone networks. Specifically, the present invention enables centralized monitoring and analysis of VPNs by coupling network probes to the MPLS service provider backbone network, thereby substantially eliminating the need to send technicians on-site to gather VPN data. Thus, customer VPN traffic may be analyzed in a quicker and more cost-effective manner than is accomplished by existing methods.

Figure 1:
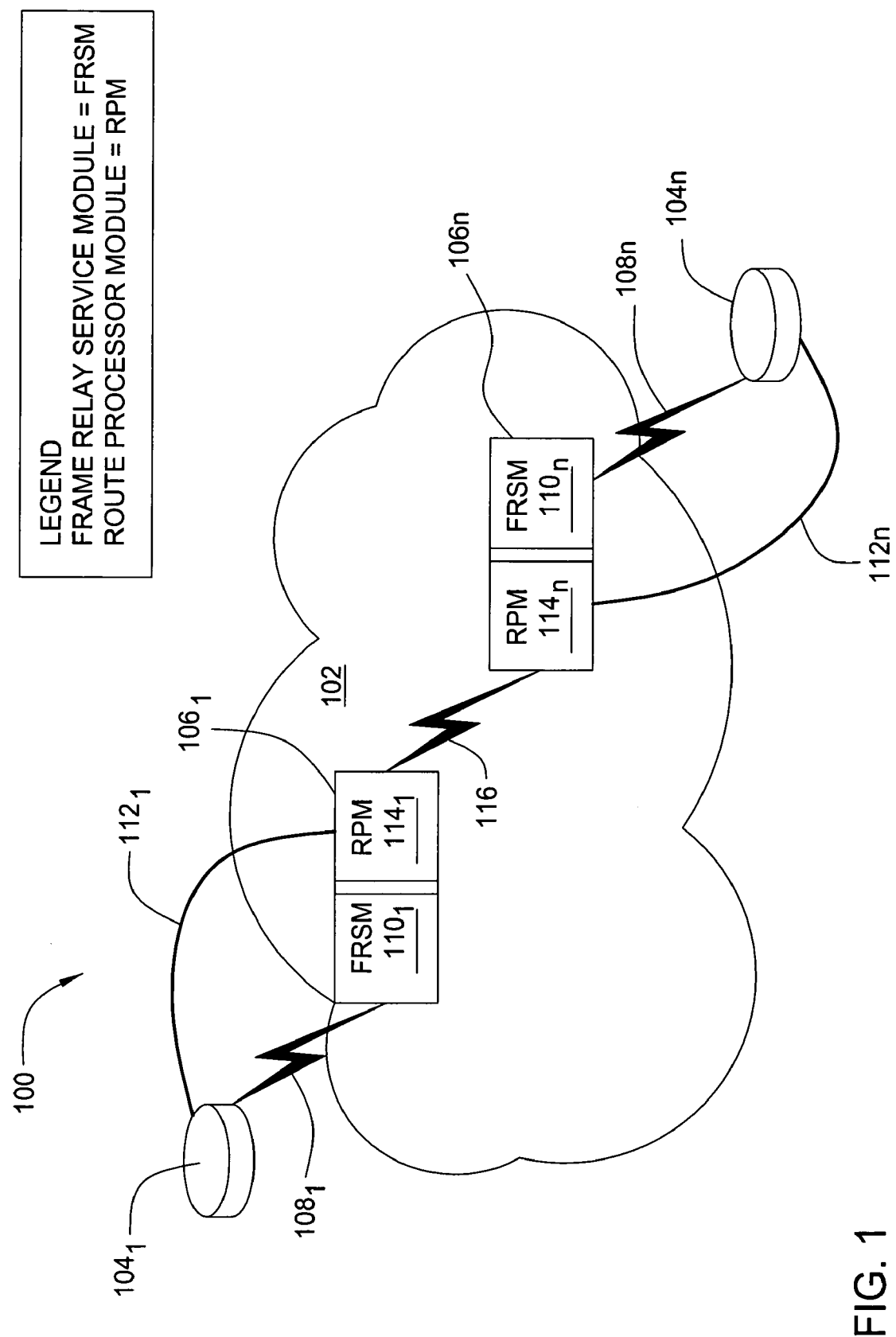
FIG. 1 is a schematic diagram illustrating an exemplary multiprotocol label switching virtual private network (MPLS VPN) connection.
Figure 2:
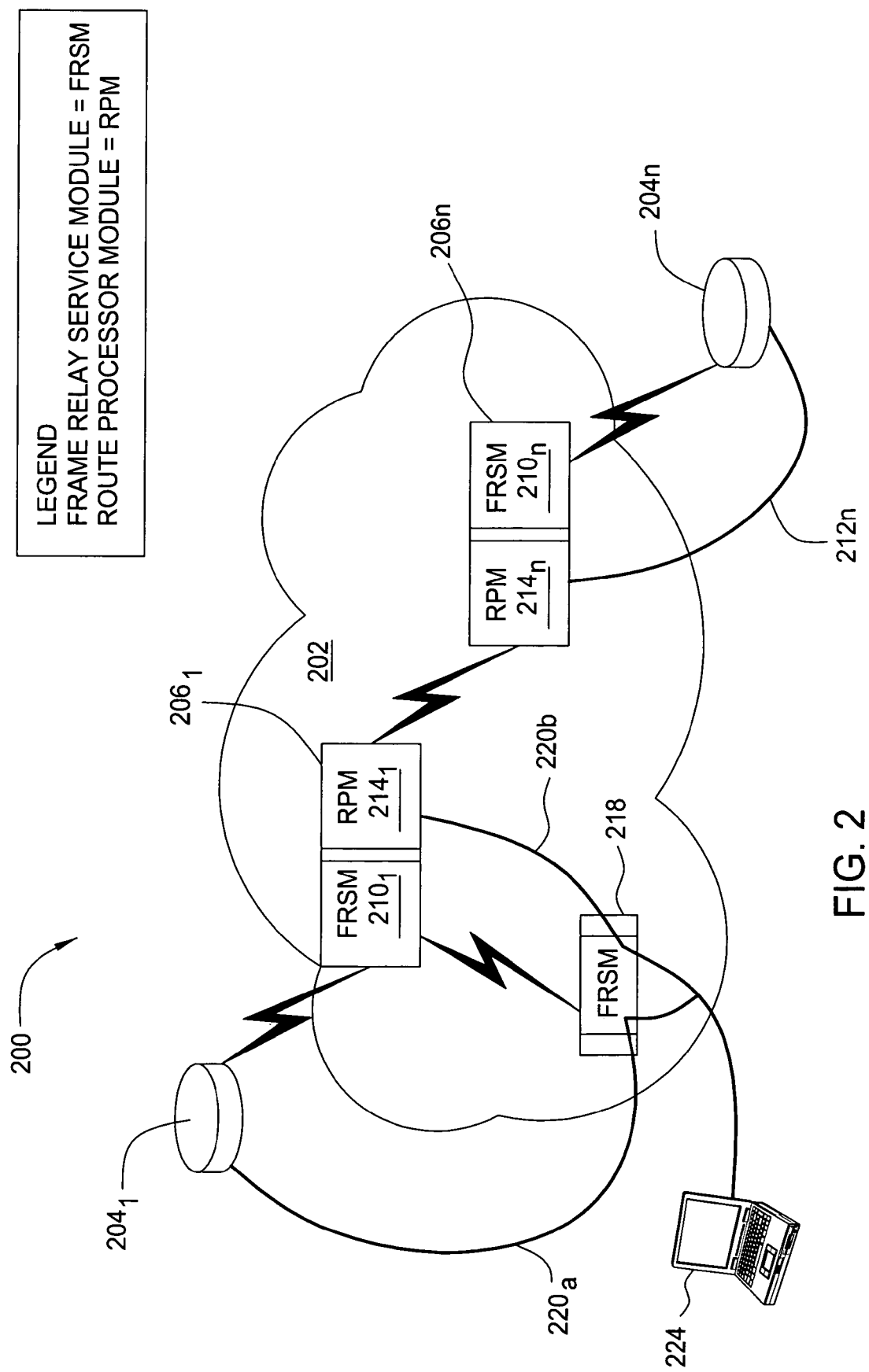
FIG. 2 is a schematic diagram illustrating an MPLS VPN connection according to the present invention, in which a probe or listening device for monitoring VPN traffic is connected to the MPLS backbone network.

FIG. 2 is a schematic diagram illustrating an MPLS VPN connection 200 according to the present invention, in which one or more network probes or listening devices 224 for monitoring VPN traffic is connected to the MPLS backbone network 202. As in FIG. 1, a plurality of customer VPNs connect to an MPLS service provider backbone network 202 via respective CE routers $204_1$-$204_n$ (hereinafter collectively referred to as "CE routers 204"), and each CE router 204 is communicatively coupled to at least one provider edge switch $206_1$-$206_n$ (hereinafter collectively referred to as "provider edge switches 206") in the backbone network 202. Each provider edge switch 206 comprises a layer-2 component $210_1$-$210_n$ (hereinafter collectively referred to as "layer-2 components 210") and a layer-3 component $214_1$-$214_n$ (hereinafter collectively referred to as "layer-3 components 214"). In one embodiment, the layer-2 components 210 are frame relay service modules (FRSMs) and the layer-3 components 214 are route processor module (RPM) components.

In addition, at least one intermediate switch 218 is deployed within the backbone network 202 and communicatively coupled to at least one provider edge switch 206. This intermediate switch 218 is further communicatively coupled to at least one network probe 224, which may be implemented as necessary to monitor traffic to and from a selected VPN. For example, in the illustrated embodiment, the probe 224 is implemented to monitor traffic to and from the VPN in which CE router 204₁ is deployed. In one embodiment, this is accomplished by re-routing the logical layer-3 connection between the CE router 204₁ and the provider edge switch 206₁ through the intermediate switch 218.

Specifically, the logical layer-3 connection is split into a first logical connection 220a and a second logical connection 220b. The first logical connection 220a connects the CE router 204₁ to the intermediate switch 218, and the second logical connection 220b connects the intermediate switch 218 to the layer-3 component 214₁ of the provider edge switch 206₁. Both the first and second logical connections 220a and 220b are adapted to duplicate packets received thereon and forward the duplicate packets to the network probe 224, which captures the duplicate packets for further analysis, as described in further detail below.

Figure 3:
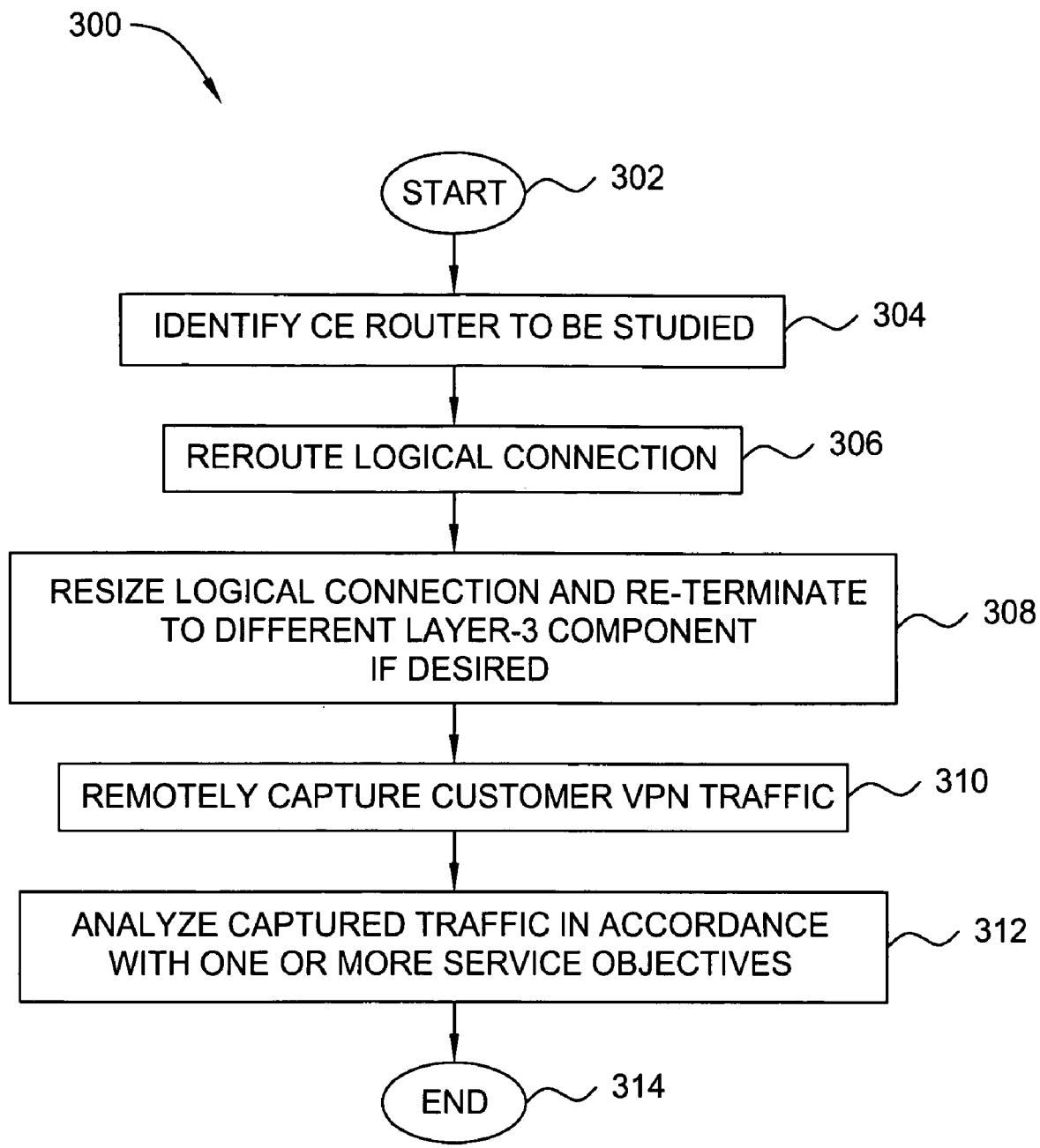
FIG. 3 is a flow diagram illustrating one embodiment of a method for monitoring VPN traffic over an MPLS backbone network according to the present invention.

FIG. 3 is a flow diagram illustrating one embodiment of a method 300 for monitoring VPN traffic over an MPLS backbone network according to the present invention. The method 300 is initialized at step 302 and proceeds to step 304, where the method 300 identifies a CE router that couples the customer VPN to be studied to the MPLS backbone network. In step 306, the method 300 reroutes the identified CE router's logical layer-3 connection, e.g., by splitting the logical layer-3 connection into first and second logical connections as described above with respect to FIG. 2.

In step 308, the method 300 resizes the logical layer-3 connection, if desired by the user, and, also if desired by the user, re-terminates the logical layer-3 connection to a different layer-3 component (e.g., of a switch other than the switch to which the CE router was originally communicatively coupled). The resizing and re-terminating of the logical layer-3 connection compensates for at least some of the latency introduced by rerouting the original logical layer-3 connection via the intermediate switch 218.

In step 310, the method 300 remotely captures traffic to and/or from the customer VPN being studied. In one embodiment, the customer VPN traffic is captured by one or more network probes connected to the MPLS backbone network supporting the customer VPN (e.g., such as network probe 224 of FIG. 2).

In step 312, the method 300 analyzes the captured traffic in accordance with one or more service objectives. In one embodiment, these service objectives include assessing network conditions for troubleshooting, monitoring traffic streams for malicious data (e.g., viruses), analyzing Voice over IP (VoIP) calls for delay or jitter (e.g., for scoring VoIP calls for voice quality), quality of service (QoS) stress testing of customer links (e.g., using a QoS-capable traffic generator), and the like. This analysis may provide solutions to improve service to VPN customers. The method 300 then terminates in step 314.

In one embodiment, the method 300 is implemented to monitor an MPLS VPN having route reflectors deployed at the highest level of the MPLS backbone control plane hierarchy, where provider routers provide connectivity to the route reflectors over label-free (e.g., Internet Protocol only) data links. In such a case, the logical connections connecting the route reflectors and the provider routers can be rerouted as described above (e.g., through an intermediate switch) to allow centralized monitoring of each route reflector/provider router pair without modification to the route reflectors or provider routers.

In some embodiments, execution of the method 300 (e.g., where VPN traffic is essentially redirected through a network probe) may cause changes in certain network conditions (e.g., latency). In such cases, the method 300 may compensate for these changes (e.g., by adding bandwidth to address increased delay) so that traffic captured by the method 300 accurately reflects the current (i.e., unaltered) state of the VPN. In one embodiment, serialization delay is reduced by increasing the maximum information rate (MIR) over the logical layer-3 connections (e.g., including rerouted logical connections) in both directions. In another embodiment, the location of the intermediate switch is chosen to minimize the impact of rerouting the logical layer-3 connection. In yet another embodiment, different provider edge switches are chosen to minimize additional latency introduced via the rerouted network topology.

The present invention thereby enables service providers to monitor and analyze customer VPN traffic on MPLS backbone networks in a centralized manner that is more efficient and more cost-effective than currently implemented methods. VPN traffic may be remotely captured and monitored, substantially eliminating the need to send technicians and equipment to a customer location each time a customer VPN requires maintenance. Thus, the time and financial costs associated with VPN maintenance are substantially reduced. Moreover, this is accomplished without substantial changes to the devices (e.g., CE routers) being monitored.

Figure 4:
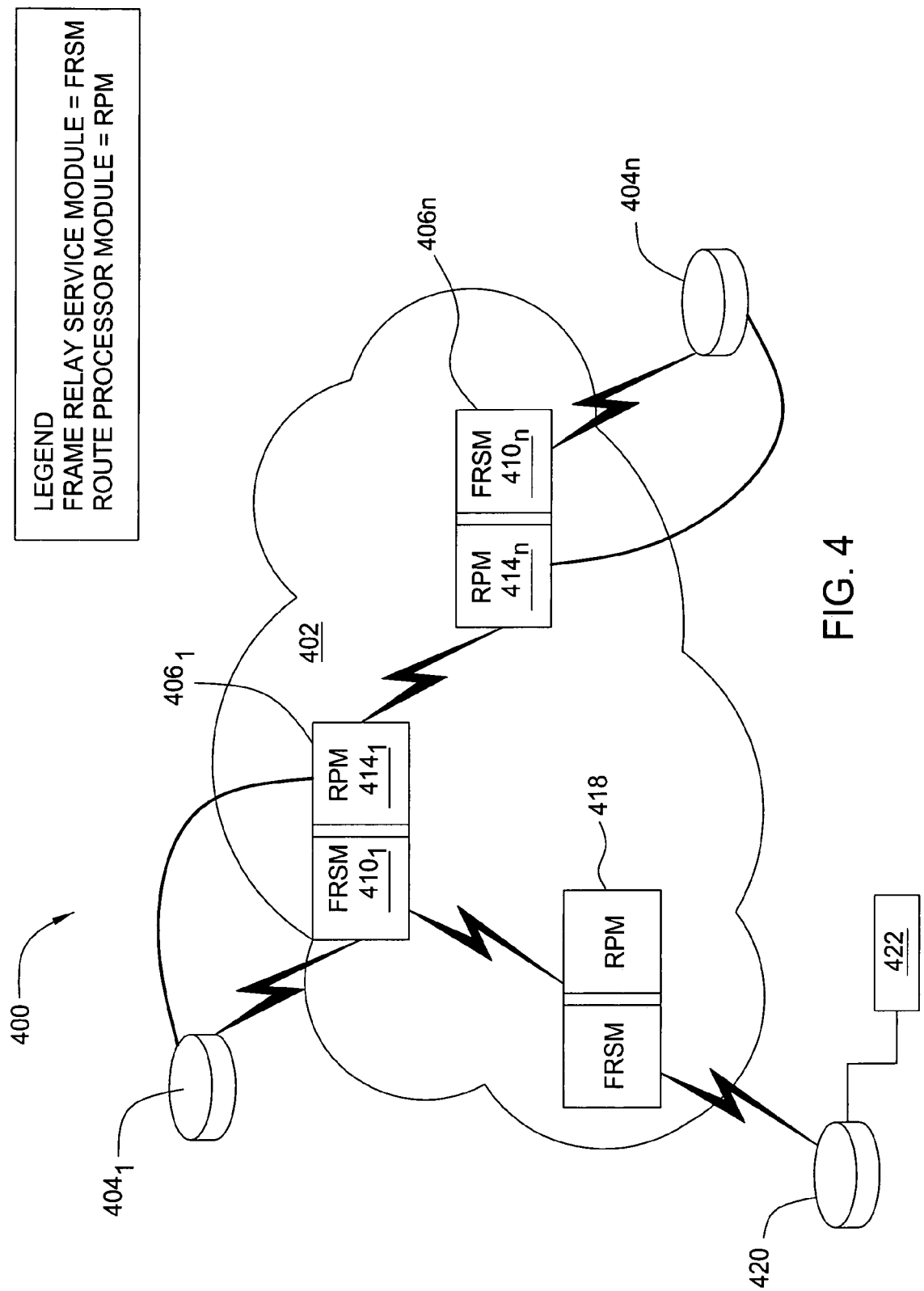
FIG. 4 is a schematic diagram illustrating an MPLS VPN connection according to the present invention, in which an active simulation device for simulating or generating network conditions is connected to the MPLS backbone network.

FIG. 4 is a schematic diagram illustrating an MPLS VPN connection 400 according to the present invention, in which an active simulation device for simulating or generating network conditions is connected to the MPLS backbone network 402. In one embodiment, this active simulation device comprises a shared CE router 420 operating in conjunction with a test traffic generator 422. As described in further detail below, the methods and apparatuses of the present invention may also be implemented to remotely simulate conditions in the MPLS backbone network and supported VPNs (as opposed to passively listening/capturing traffic). In one embodiment, simulation of network conditions may be implemented in accordance with the method 300 in order to observe how hypothetical network changes may affect VPN functionality.

As in FIGS. 1 and 2, a plurality of customer VPNs connect to an MPLS service provider backbone network 402 via respective CE routers 404₁-404ₙ (hereinafter collectively referred to as "CE routers 404"), and each CE router 404 is communicatively coupled to at least one provider edge switch 406₁-406ₙ (hereinafter collectively referred to as "provider edge switches 406") in the backbone network 402. Each provider edge switch 406 comprises a layer-2 component 410₁-410ₙ (hereinafter collectively referred to as "layer-2 components 410") and a layer-3 component 414₁-414ₙ (hereinafter collectively referred to as "layer-3 components 414"). In one embodiment, the layer-2 components 410 are frame relay service modules (FRSMs) and the layer-3 components 414 are route processor module (RPM) components.

In addition, at least one intermediate switch 418 is deployed within the backbone network 402. This intermediate switch 418 is further communicatively coupled to the shared CE router 420, which is in turn coupled to the test traffic generator 422 that is adapted for generating artificial network conditions (e.g., less/more delay, bandwidth, etc.).

The test traffic generator 422 is adapted to generate test patterns and data (e.g., for VPN troubleshooting) and send the generated test data to the shared CE router 420. The shared CE router 420 is adapted to send the test data received from the test traffic generator 422 over the MPLS backbone network to any one or more CE routers 404 connected to the MPLS backbone network 402. In this way, test traffic may be injected into one or more selected VPNs for troubleshooting and analysis.

In one embodiment, layer-3 routing information (e.g., comprising static routes) is incorporated into the active simulation device to allow routing of customer VPN traffic. In another embodiment, the active simulation device is further configured to maintain multiple independent routing tables associated with specific VPN interfaces. In yet another embodiment, dynamic routing protocols are defined between the active simulation device and one or more provider edge switches 406, so that the re-routed logical layer-3 connection behaves in a manner similar to a local area network (LAN) connection. These three embodiments allow the solution to be scaled to monitor or to interact with multiple MPLS VPNs simultaneously.

Figure 5:
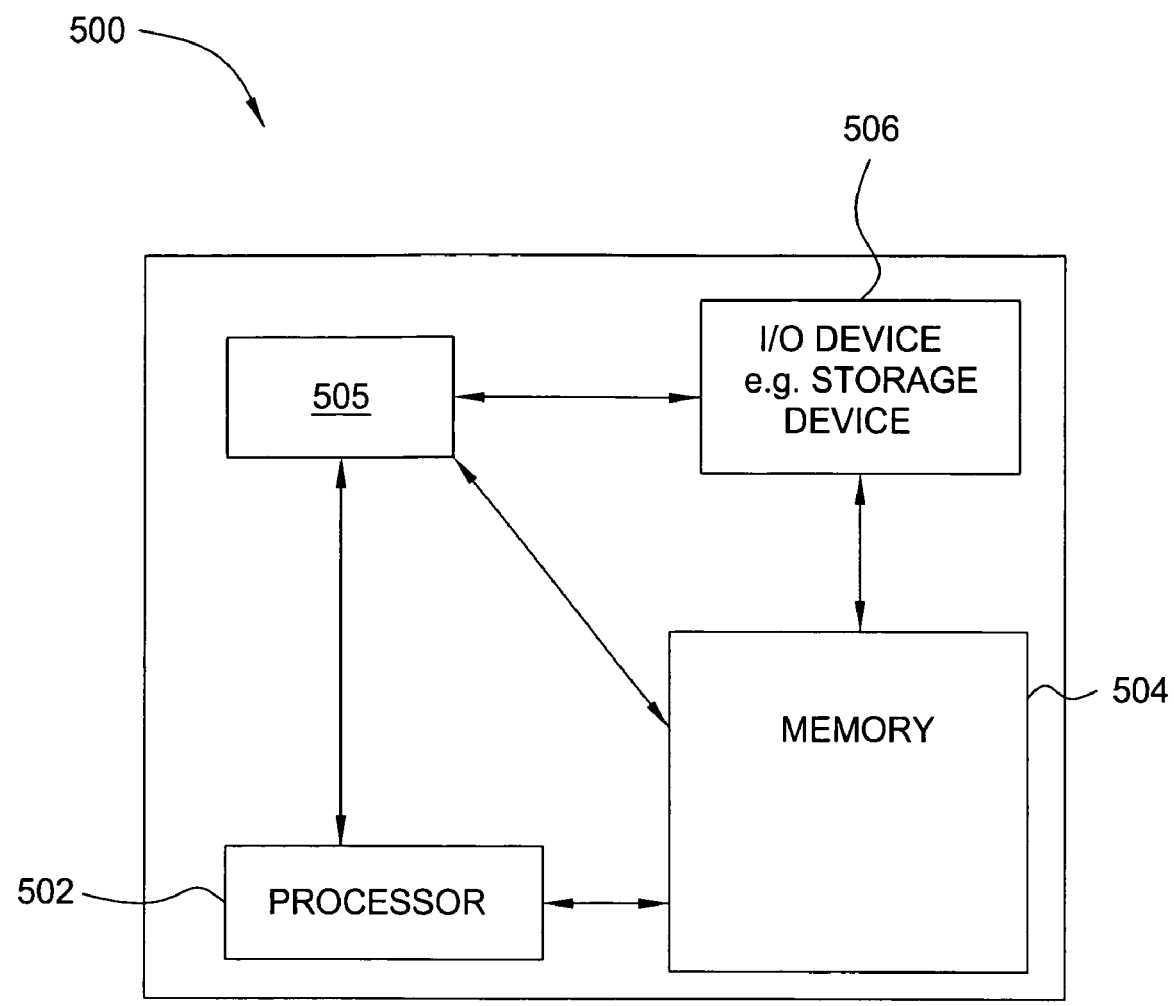
FIG. 5 is a high level block diagram of the present centralized MPLS VPN monitoring system that is implemented using a general purpose computing device 500.

FIG. 5 is a high level block diagram of the present centralized MPLS VPN monitoring system that is implemented using a general purpose computing device 500. In one embodiment, a general purpose computing device 500 comprises a processor 502, a memory 504, an MPLS VPN monitoring component or module 505 and various input/output (I/O) devices 506 such as a display, a keyboard, a mouse, a modem, and the like. In one embodiment, at least one I/O device is a storage device (e.g., a disk drive, an optical disk drive, a floppy disk drive). It should be understood that the MPLS VPN monitoring component 505 can be implemented as a physical device or subsystem that is coupled to a processor through a communication channel.

Alternatively, the MPLS VPN monitoring component 505 can be represented by one or more software applications (or even a combination of software and hardware, e.g., using Application Specific Integrated Circuits (ASIC)), where the software is loaded from a storage medium (e.g., I/O devices 506) and operated by the processor 502 in the memory 504 of the general purpose computing device 500. Thus, in one embodiment, the MPLS VPN monitoring component 505 for monitoring VPN traffic supported on an MPLS backbone network described herein with reference to the preceding Figures can be stored on a computer readable medium or carrier (e.g., RAM, magnetic or optical drive or diskette, and the like).

Thus, the present invention represents a significant advancement in the fields of service networks and VPN monitoring and analysis. A method and apparatus are disclosed that allow a service provider to quickly and cost-effectively analyze and troubleshoot customer VPN traffic over MPLS backbone networks using automatic, inexpensive systems. Moreover, the methods and apparatuses of the present invention may be deployed to provide advantages in a variety of other telecommunications applications.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for monitoring one or more virtual private networks supported on a multiprotocol label switching backbone network, the method comprising:
    remotely capturing traffic to or from at least one virtual private network supported on the multiprotocol label switching backbone network;
    analyzing said captured traffic in accordance with one or more service objectives; and
    remotely simulating network conditions in said at least one virtual private network, wherein said simulating comprises:
        sending test patterns or test data to a shared customer edge router connected to said at least one virtual private network;
        forwarding said test patterns or test data, via said shared customer edge router, to said multiprotocol label switching backbone network; and
        forwarding said test patterns or test data over said multiprotocol label switching backbone network to a discrete customer edge router associated with said at least one virtual private network.

2. A computer readable medium containing an executable program for monitoring one or more virtual private networks supported on a multiprotocol label switching backbone network, where the program performs the steps of:
    remotely capturing traffic to or from at least one virtual private network supported on the multiprotocol label switching backbone network;
    analyzing said captured traffic in accordance with one or more service objectives; and
    remotely simulating network conditions in said at least one virtual private network, wherein said simulating comprises:
        sending test patterns or test data to a shared customer edge router connected to said at least one virtual private network;
        forwarding said test patterns or test data, via said shared customer edge router, to said multiprotocol label switching backbone network; and
        forwarding said test patterns or test data over said multiprotocol label switching backbone network to a discrete customer edge router associated with said at least one virtual private network.

* * * * *